United States Patent [19]
Hamid

[11] Patent Number: 6,038,334
[45] Date of Patent: *Mar. 14, 2000

[54] METHOD OF GATHERING BIOMETRIC INFORMATION

[75] Inventor: Laurence Hamid, Ottawa, Canada

[73] Assignee: Dew Engineering and Development Limited, Ottawa, Canada

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/804,267

[22] Filed: Feb. 21, 1997

[51] Int. Cl.$^7$ .................................................. G06K 9/00
[52] U.S. Cl. ............................................ 382/124
[58] Field of Search .................... 382/115, 116, 382/124, 125, 127, 225; 340/825.31, 825.34

[56] References Cited

U.S. PATENT DOCUMENTS

| | | | |
|---|---|---|---|
| 4,210,899 | 7/1980 | Swonger et al. | 340/825.31 |
| 4,581,760 | 4/1986 | Schiller et al. | 382/124 |
| 4,805,222 | 2/1989 | Young et al. | 340/825.31 |
| 4,993,068 | 2/1991 | Piosenka et al. | 382/116 |
| 5,229,764 | 7/1993 | Matchett et al. | 382/115 |
| 5,448,649 | 9/1995 | Chen et al. | 382/126 |
| 5,513,272 | 4/1996 | Bogosian, Jr. | 382/116 |
| 5,613,014 | 3/1997 | Eshera et al. | 382/124 |
| 5,719,950 | 2/1998 | Osten et al. | 382/115 |
| 5,933,515 | 8/1999 | Pu et al. | 382/124 |

FOREIGN PATENT DOCUMENTS

| | | | |
|---|---|---|---|
| 61-175865 | 8/1986 | Japan | G06K 9/00 |
| 08016788 | 1/1996 | Japan | G06T 7/00 |
| WO 96/41297 | 12/1996 | WIPO | G06K 9/00 |

*Primary Examiner*—Amelia Au
*Assistant Examiner*—Samir Ahmed
*Attorney, Agent, or Firm*—Gordon Freedman; Neil Teitelbaum

[57] ABSTRACT

In the past, user authorization based on biometric information was conducted by correlating a single instance of biometric information against a template. By using this method, a percentage of the population is difficult to authenticate. Further, due to skin damage and injuries, sometimes biometric information is not suited to identification. A sore throat affecting voice information and scraped finger tips affecting fingerprint information are two examples of common problems with authorization in dependence upon biometric information. A method of authenticating a user in dependence upon biometric input information is disclosed. The method allows a user to select biometric information sources and a number of repetitions for each source in order to customize the process of biometric user authentication.

16 Claims, 12 Drawing Sheets

Fig. 2b

Please provide Fingerprint from left ring finger.
Please provide Fingerprint from right thumb.
Please provide Fingerprint from right index finger.

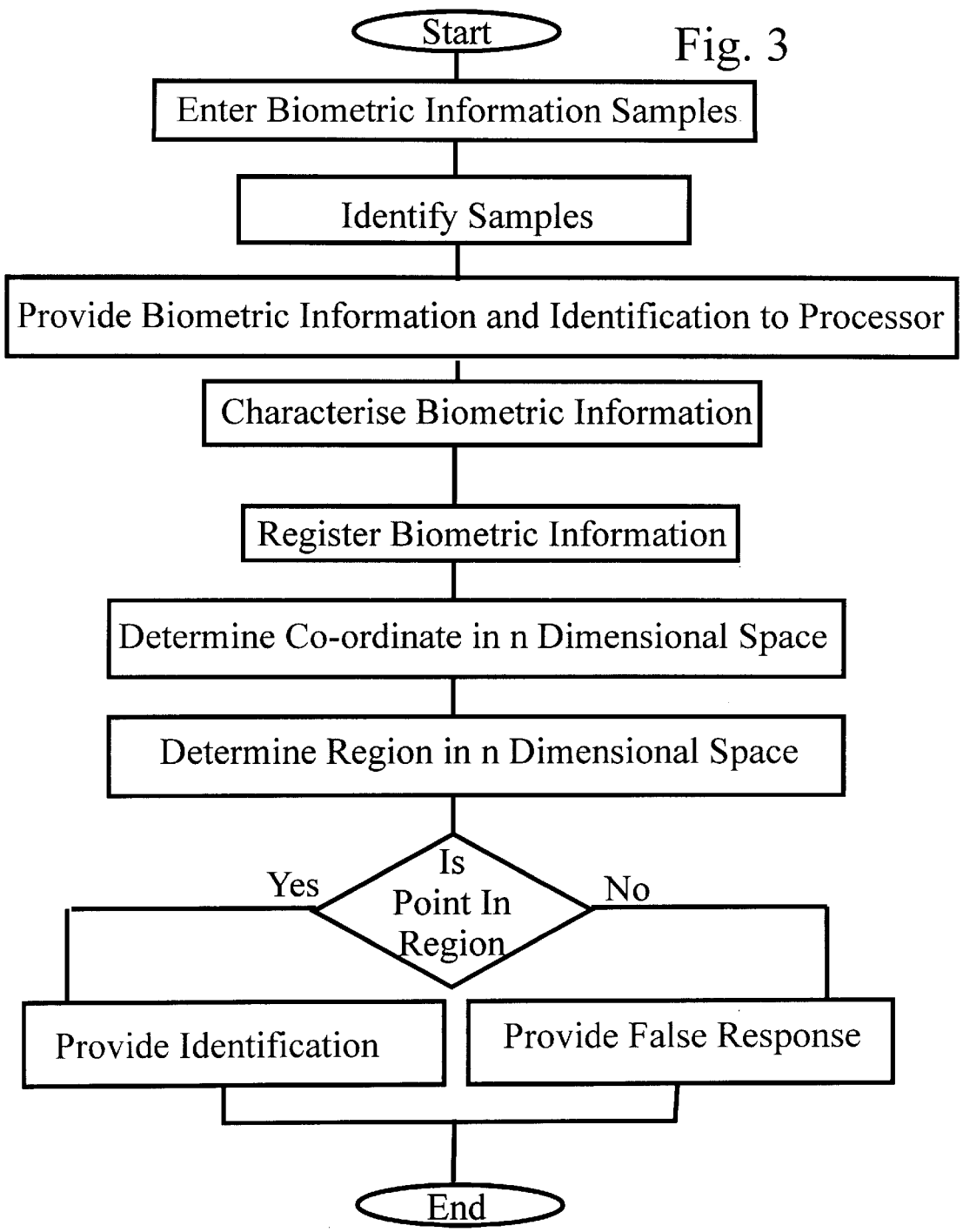

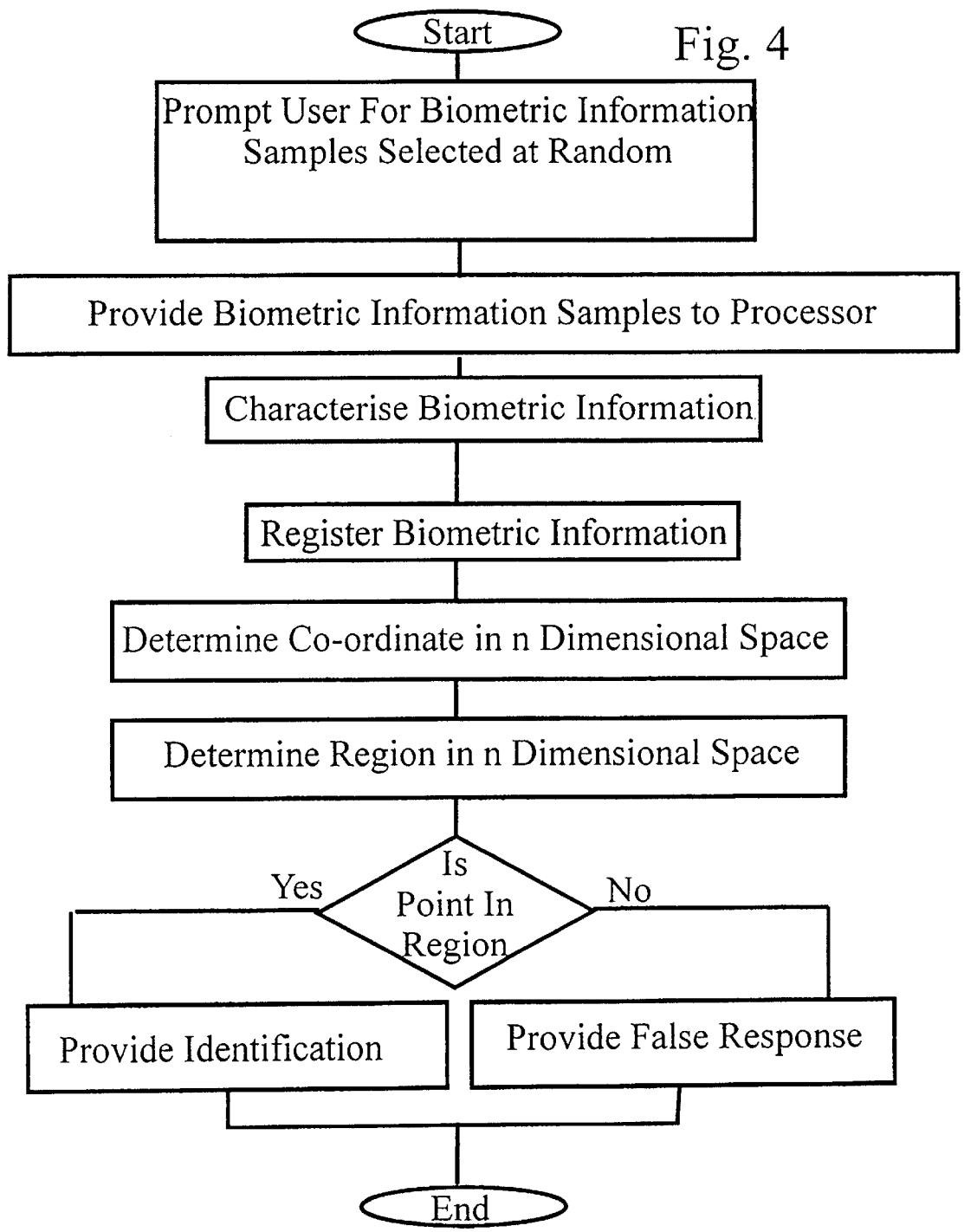

METHOD OF GATHERING BIOMETRIC INFORMATION

FIELD OF THE INVENTION

This invention relates generally to identification of individuals and more particularly relates to a method of selectively providing biometric information to a system for identification of individuals.

BACKGROUND OF THE INVENTION

Computer security is fast becoming an important issue. With the proliferation of computers and computer networks into all aspects of business and daily life—financial, medical, education, government, and communications—the concern over secure file access is growing. Using passwords is a common method of providing security. Password protection and/or combination type locks are employed for computer network security, automatic teller machines, telephone banking, calling cards, telephone answering services, houses, and safes. These systems generally require the knowledge of an entry code that has been selected by a user or has been preset.

Preset codes are often forgotten as users have no reliable method of remembering them. Writing down the codes and storing them in close proximity to an access control device (i.e. The combination lock) results in a secure access control system with a very insecure code. Alternatively, the nuisance of trying several code variations renders the access control system more of a problem than a solution.

Password systems are known to suffer from other disadvantages. Usually, passwords are specified by a user. Most users, being unsophisticated users of security systems, choose passwords which are relatively insecure. As such, many password systems are easily accessed through a simple trial and error process.

A security access system that provides substantially secure access and does not require a password or access code is a biometric identification system. A biometric identification system accepts unique biometric information from a user and identifies the user by matching the information against information belonging to registered users of the system. One such biometric identification system is a fingerprint recognition system.

In a fingerprint input transducer or sensor, the finger under investigation is usually pressed against a flat surface, such as a side of a glass plate; the ridge and valley pattern of the finger tip is sensed by a sensing means such as an interrogating light beam.

Various optical devices are known which employ prisms upon which a finger whose print is to be identified is placed. The prism has a first surface upon which a finger is placed, a second surface disposed at an acute angle to the first surface through which the fingerprint is viewed and a third illumination surface through which light is directed into the prism. In some cases, the illumination surface is at an acute angle to the first surface, as seen for example, in U.S. Pat. Nos. 5,187,482 and 5,187,748. In other cases, the illumination surface is parallel to the first surface, as seen for example, in U.S. Pat. Nos. 5,109,427 and 5,233,404. Fingerprint identification devices of this nature are generally used to control the building-access or information-access of individuals to buildings, rooms, and devices such as computer terminals.

U.S. Pat. No. 4,353,056 in the name of Tsikos issued Oct. 5, 1982, discloses an alternative kind of fingerprint sensor that uses a capacitive sensing approach. The described sensor has a two dimensional, row and column, array of capacitors, each comprising a pair of spaced electrodes, carried in a sensing member and covered by an insulating film. The sensors rely upon deformation to the sensing member caused by a finger being placed thereon so as to vary locally the spacing between capacitor electrodes, according to the ridge/trough pattern of the fingerprint, and hence, the capacitance of the capacitors. In one arrangement, the capacitors of each column are connected in series with the columns of capacitors connected in parallel and a voltage is applied across the columns. In another arrangement, a voltage is applied to each individual capacitor in the array. Sensing in the respective two arrangements is accomplished by detecting the change of voltage distribution in the series connected capacitors or by measuring the voltage values of the individual capacitances resulting from local deformation. To achieve this, an individual connection is required from the detection circuit to each capacitor.

Before the advent of computers and imaging devices, research was conducted into fingerprint characterisation and identification. Today, much of the research focus in biometrics has been directed toward improving the input transducer and the quality of the biometric input data. Fingerprint characterization is well known and can involve many aspects of fingerprint analysis. The analysis of fingerprints is discussed in the following references which are hereby incorporated by reference:

Xiao Qinghan and Bian Zhaoqi,: An approach to Fingerprint Identification By Using the Attributes of Feature Lines of Fingerprint," IEEE Pattern Recognition, pp 663, 1986;

C. B. Shelman, "Fingerprint Classification—Theory and Application," Proc. 76 Carnahan Conference on Electronic Crime Countermeasures, 1976;

Feri Pernus, Stanko Kovacic, and Ludvik Gyergyek, "Minutaie Based Fingerprint Registration," IEEE Pattern Recognition, pp 1380, 1980;

J. A. Ratkovic, F. W. Blackwell, and H. H. Bailey, "Concepts for a Next Generation Automated Fingerprint System," Proc. 78 Carnahan Conference on Electronic Crime Countermeasures, 1978;

K. Millard, "An approach to the Automatic Retrieval of Latent Fingerprints," Proc. 75 Carnahan Conference on Electronic Crime Countermeasures, 1975;

Moayer and K. S. Fu, "A Syntactic Approach to Fingerprint Pattern Recognition," Memo Np. 73-18, Purdue University, School of Electrical Engineering, 1973;

Wegstein, An Automated Fingerprint Identification System, NBS special publication, U.S. Department of Commerce/National Bureau of Standards, ISSN 0083-1883; no. 500–89, 1982;

Moenssens, Andre A., *Fingerprint Techniques*, Chilton Book Co., 1971; and, Wegstein and J. F. Rafferty, The LX39 Latent Fingerprint Matcher, NBS special publication, U.S. Department of Commerce/National Bureau of Standards; no. 500-36, 1978.

OBJECT OF THE INVENTION

It is an object of this invention to provide a method for selectively entering biometric information for verification and for verification of an identity of a source of the biometric information.

It is a further object of the invention to provide a method of expanding the flexibility of biometric identification systems.

SUMMARY OF THE INVENTION

In accordance with the invention there is provided a method of registering biometric information of an individual comprising the steps of:

a) providing a biometric information sample from each of a plurality of biometric sources of the individual to at least one biometric input device in communication with a host processor;

b) associating each biometric information sample provided with a biometric source; and, c) using the processor, registering each biometric information sample against a template associated with the associated biometric source.

In accordance with the invention there is provided a method of registering biometric information of an individual in dependence upon stored templates of biometric information comprising the steps of:

a) providing a set of parameters comprising a set of biometric information sources to a host processor;

b) in dependence upon the set of biometric information sources, providing biometric information samples from at least some of the sources to at least a biometric input device in communication with the host processor;

c) using the host processor, registering the biometric information samples against some of the templates to produce a set of registration values;

d) determining if a point in a multidimensional space and having coordinates corresponding substantially to the registration values falls within a multidimensional range determined in dependence upon a predetermined false acceptance rate; and, e) identifying the individual when the point falls within the multidimensional range corresponding to the acceptable false acceptance rate.

In accordance with a further aspect of the invention, there is provided a system for registering biometric information of an individual. The system comprises:

a) means for providing a biometric information sample from each of a plurality of biometric sources of the individual to at least one biometric input device in communication with a host processor;

b) means for associating each biometric information sample provided with a biometric source;

c) means for using the processor, registering each biometric information sample against a template associated with the associated biometric source;

d) means for determining registration values in dependence upon the results of step (c); and, e) means for identifying the individual in dependence upon the registration values.

In accordance with the invention, there is provided a system for registering biometric information of an individual. The system comprises:

a) means for providing a biometric information sample from each of a plurality of biometric sources of the individual to at least one biometric input device in communication with a host processor;

b) means for associating each biometric information sample provided with a biometric source;

c) means for using the processor, registering each biometric information sample against a template associated with the associated biometric source;

d) means for determining registration values in dependence upon the results of step (c);

e) means for determining if a point in a multidimensional space and having coordinates corresponding substantially to the registration values falls within a multidimensional range determined in dependence upon a predetermined false acceptance rate; and, f) means for identifying the individual when the point falls within the multidimensional range.

It is an advantage of the present invention to lessen false registrations while, at a same time, increasing a number of people identified by a biometric security system.

BRIEF DESCRIPTION OF THE DRAWINGS

An exemplary embodiment of the invention will now be described in conjunction with the attached drawings, in which:

FIG. 2b is a simplified diagram of a display having prompts thereon requesting provision of biometric information from predetermined biometric information sources;

FIG. 3 is a flow diagram of another method of providing biometric information and identifying a user in dependence thereon according to the invention;

FIG. 4 is a flow diagram of another method of providing biometric information and identifying a user in dependence thereon according to the invention;

DETAILED DESCRIPTION

The invention is described with respect to finger print registration. The method of this invention is applicable to other biometric verification processes as is evident to those of skill in the art.

One of the problems with a finger print biometric is that a segment of the population can have temporary or permanent skin conditions which cause poor image quality on the scanning device which in turn causes them to experience high false rejection rates. By allowing candidates to use more than one finger during authentication, lower thresholds for authentication are combined in a way which confirms identities yet does not compromise the level of false acceptances for the system.

Thresholds from a set of distinct fingerprints from a candidate that would usually be rejected for being too insecure are combined according to this method to allow acceptance in dependence upon a plurality of biometric information samples. Thus a candidate lowers the chance of being falsely rejected by supplying multiple biometric information samples in the form of fingerprints for authentication.

Figure 1:
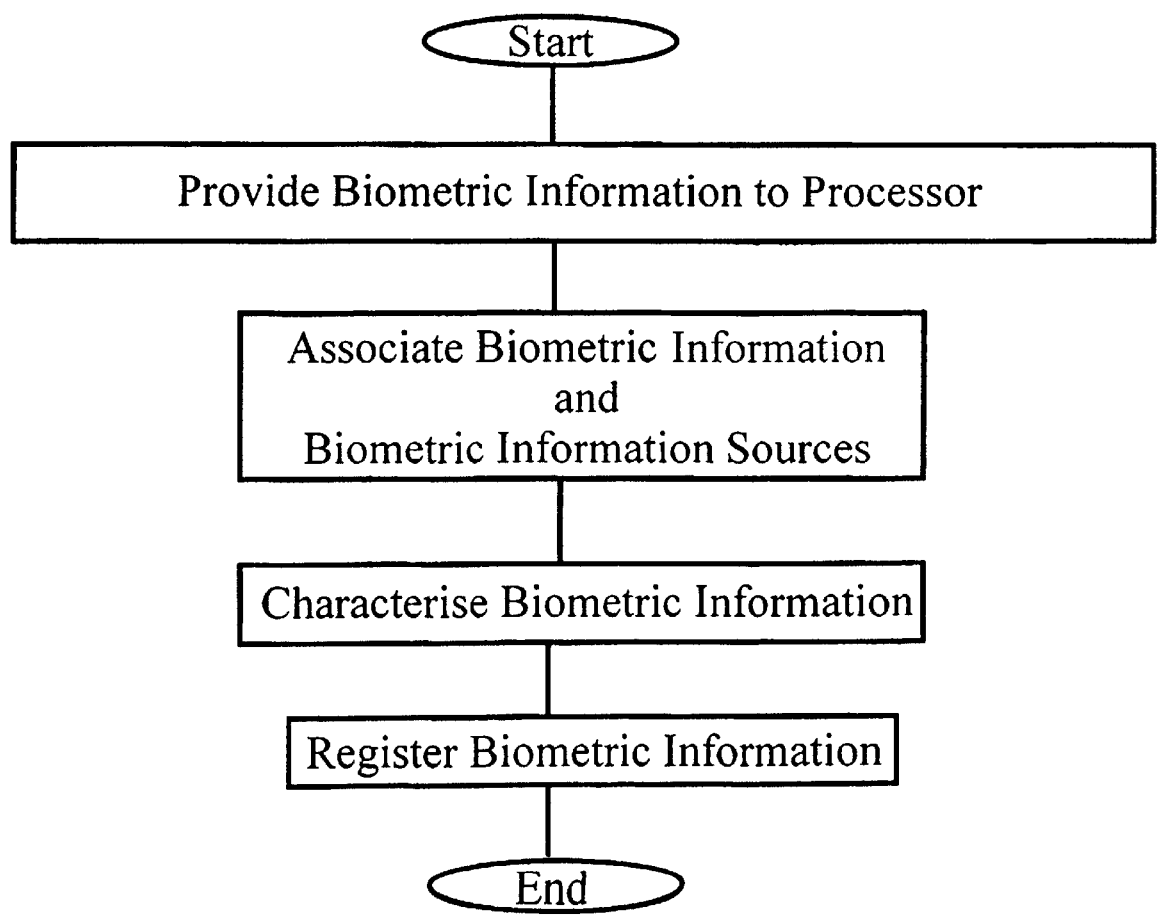
FIG. 1 is a flow diagram of a method of providing biometric information according to the invention.

Referring to FIG. 1, a flow diagram of an embodiment of the invention is shown. Biometric information in the form of fingerprints is provided to a processor. According to the invention, a plurality of samples from at least two biometric information sources is provided. These samples are in the form of fingerprints, palm prints, voice samples, retinal scans, or other biometric information samples.

Requiring an individual to enter biometric information samples from at least two biometric information sources, allows for improved registration results and reduced false acceptance. For example, some individuals are known to be commonly falsely accepted or identified. The false acceptance often is a result of similarities between biometric information samples from a biometric information source of a registered individual and from a biometric information source of another individual. These similarities are often only present for a specific similar biometric information source such as a left index finger or a right thumb. The provision and registration of two biometric information samples, reduces likelihood of similarity because, where before similarity of a single biometric information source resulted in false acceptance, now similarity in two different sources is unlikely. Therefore, requiring a minimum of two biometric information sources reduces any likelihood of false acceptance. The use of a plurality of varied biometric information sources in the form of retinal scans, voice prints, finger prints, palm prints, toe prints, etc. further reduces probability of false registration; it is unlikely that the varied biometric information from two individuals is similar.

Similarly, requiring an individual to enter biometric information samples from at least two biometric information sources reduces the probability of false rejection. As the likelihood of false acceptance decreases, a lower threshold for acceptance becomes acceptable. Both false rejection and false acceptance are reduced.

Each biometric information sample is associated with a biometric information source in the form of a fingertip, a retina, a voice, a palm, etc. The association allows for comparison between the biometric information sample and a template associated with the biometric information source. When an individual's identity is provided to the processor or is known, the biometric information sample is only compared to a single template associated with the biometric information source. Alternatively, the biometric information sample is compared against a plurality of templates. Comparing biometric information samples is often referred to as registering the biometric information samples. Many methods are known for performing the registration. Commonly, the biometric information sample is characterized according to a method specific to the template. The template and the characterized biometric information sample are compared to determine a registration value. The registration value is then used to determine identification; to provide access to a system or structure; to log access; to monitor use; for billing; or for other purposes.

When an individual's alleged identity is not provided to the processor or known to the processor, the characterized biometric information is registered against templates stored in a database of templates in order to locate those registrations which are indicative of a predetermined characteristic. The characteristic is often identity but other characteristics are also known. Because a plurality of biometric information samples are provided, the registration against templates is for locating a plurality of templates which are indicative of a predetermined characteristic. When the characteristic is identity, the templates are from a same individual and the registration process tries to locate a set of templates that registers with the characterized biometric information samples resulting in a set of values indicative of accurate identification.

Figure 1B:
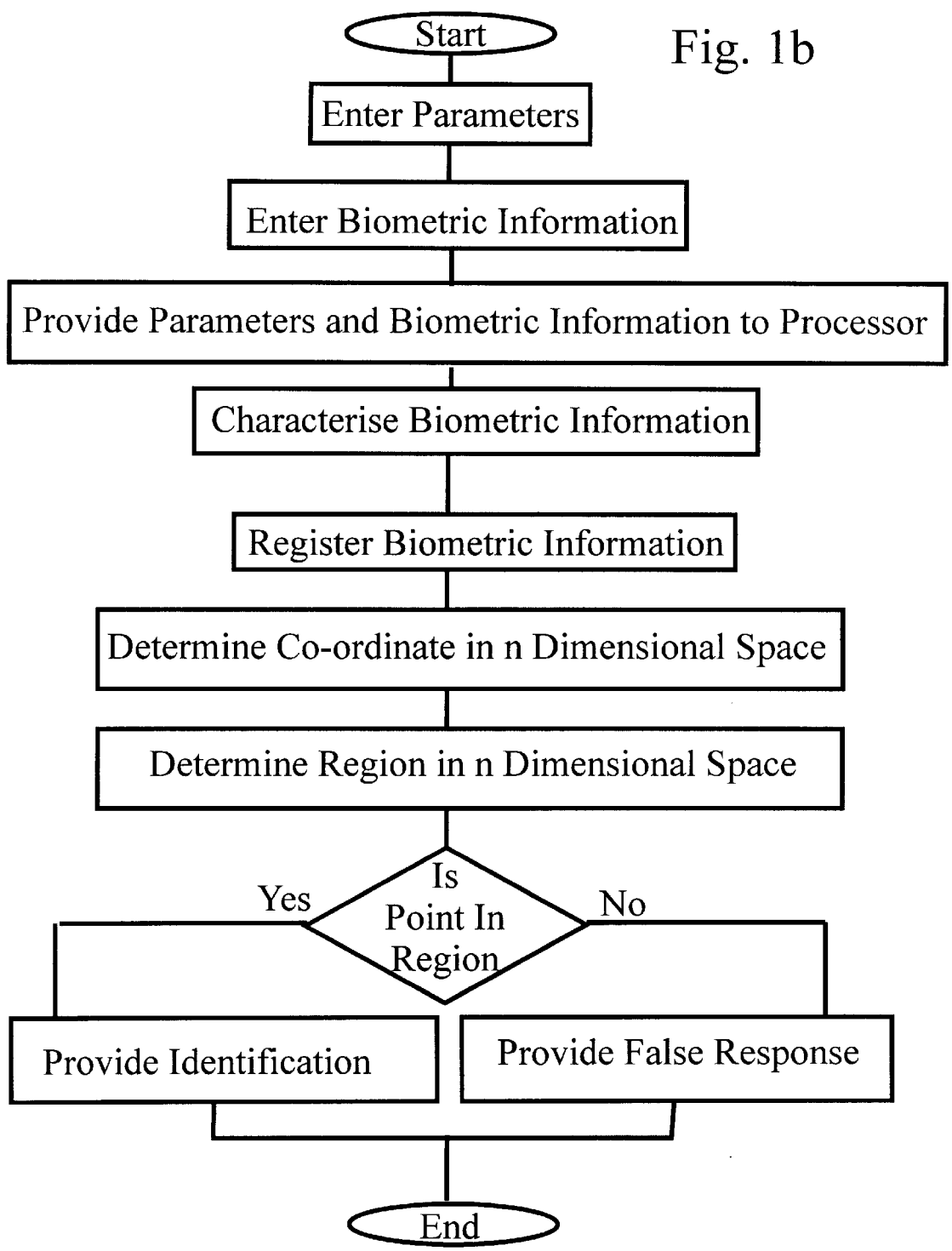
FIG. 1b is a flow diagram of a method of providing biometric information and identifying a user in dependence thereon according to the invention.

Referring to FIG. 1b, a flow diagram of an embodiment of the invention for identifying an individual is shown. An individual seeking authentication by a user authorization system is presented with a parameter entry means. Parameter entry means are well known in the art of computer science. Some examples of parameter entry means include dedicated switches; software for execution on a processor and for providing an individual with means for selecting or customizing parameters in the form of prompts, a command line, or a graphical user interface; cards or other storage means for provision to a device capable of reading stored parameters and providing them to a processor; wireless data entry; and voice data entry systems.

Figure 2:
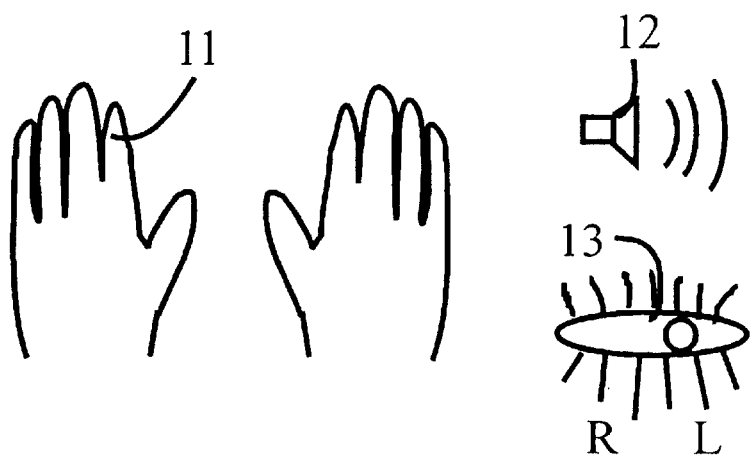
FIG. 2 is a simplified diagram of a user interface for entering parameters according to the invention.

Using the parameter entry means, the individual determines biometric information sample parameters. The parameters are selected from a known group of available parameters. Examples of known groups of biometric information samples include (right index finger, left index finger, left thumb); (right index finger, voice); (retinal scan, voice); (left thumb, left middle finger); etc. Groupings reduce user entry requirements; however, groupings also reduce flexibility. Alternatively, parameters are entered by an individual selecting from all available parameters in order to determine a group. For example, an individual is presented with a graphical display, as shown in FIG. 2, of biometric information sources in the form of fingers 11 and selects a number of samples for each source. When a voice recognition system is incorporated into the user authorization system, an icon 12 representing voice is also displayed. When a retinal scanning system is incorporated, an icon 13 representing the retinal scan is displayed. Other icons are displayed when corresponding biometric identification systems are present. The individual enters parameters in the form of identifying biometric information sources and for each source a quantity of samples being provided.

Preferably a minimum set of requirements exist which, though flexible, ensures sufficient levels of security. Requiring each individual to enter information from a minimum number of biometric information sources and perhaps a maximum number of samples from a same biometric information source, allows for maintenance of at least a predetermined security level.

Once the parameters have been entered, the individual enters biometric information in the form of fingerprints into the system in accordance with the parameters. Preferably, the parameters once selected are sent to a processor for analysis and the individual is prompted to enter each biometric information sample. Alternatively, the parameters and the biometric information in the form of representations of fingerprints are sent to a processor together.

Figure 2A:
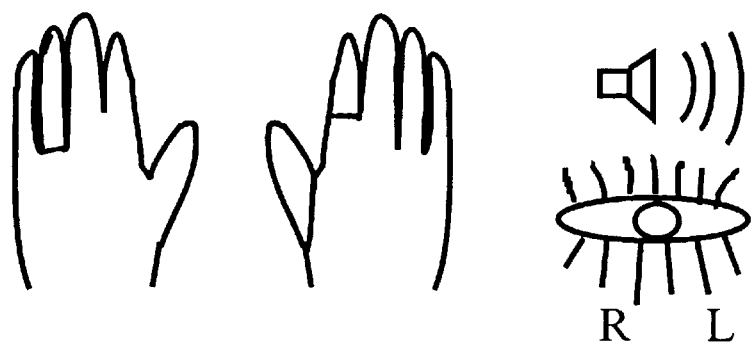
FIG. 2a is a simplified diagram of FIG. 2 with some parameters selected for entry.

The biometric information provided by the individual is related to the parameters selected. For example, referring to FIG. 2a, when the individual selects left ring finger once, right thumb once, and right index finger once, the individual then provides a sample of a fingerprint from the left ring finger, a fingerprint sample from the right thumb and a fingerprint sample from the right index finger. Prompting, shown in FIG. 2b, allows the individual to select very complicated sets of biometric information sources or to select from predetermined sets without remembering the parameters and/or an order for the parameters.

A biometric input means in the form of a live fingerprint scanning device is used to collect the biometric information in the form of images of fingerprints of the individual which are entered in a predetermined order. Each biometric information sample is identified. When the individual is prompted for a biometric information sample, the processor labels the samples. Alternatively, an individual enters parameters and biometric information simultaneously by entering a biometric information sample and identifying the sample as, for example, a specific fingerprint or a voice sample. Optionally, the individual is provided with a means of reviewing and accepting or discarding biometric information samples.

The authentication procedure determines an independent sequence of comparison scores from the input provided by the candidate. This sequence is considered to be a point, hereinafter referred to as P, in n-dimensional vector space, $R^n$. A threshold function $h_\alpha$: $R^n \rightarrow R$ is used to determine whether or not the point belongs to a set $U_\alpha$ by $P \in U_\alpha \Leftrightarrow h_\alpha(P) \geq C_\alpha$. The identity of the individual is confirmed if and only if $P \in U_\alpha$.

The biometric information sample identifiers are used to uniquely identify the input samples. Let I be the set of input images, $I = \{I_i | 1 \leq i \leq N\}$. For $I_i \in I$, let $Id_i$ be the identifier of an image, let $T_i$ be the characterization or template of the image, and let $T_i^*$ be the reference template of the image.

Define the equivalence relation ≡, on the set I by $$I_i \equiv I_j \Leftrightarrow Id_i = Id_j,$$

The sets $H_k = \{I_i | I_i I_k\}$
are equivalence classes that partition the set of input images into sets of images that belong to a same finger tip. There are n of these classes where $1 \leq n \leq N$.

When $\tau$ is a set of all fingerprint templates generated by a given characterization algorithm and score: $\tau \times \tau \rightarrow R$ is the measure generated by an associated matching algorithm, then we can construct a set of class representative, $I_R$, which contains one representative for each $H_k$:

$$I_R = \left\{ I_j \in H_k \mid score(T_j, T_j^*) = \max_{I_i \in H_k} \{score(T_i, T_i^*)\}, 1 \leq k \leq N \right\}$$

The set $I_R \subset I$, is then a set of images of the distinct input fingerprints that achieve the highest scores. Alternatively, multiple samples of a same fingerprint are considered.

For each $I_i \in I_R$, $1 \leq i \leq n$, let $x_i = score(T_i, T_i^*)$ correspond to scores from the matching algorithm. Any ordering of these scores is a point in the vector space $R_n$, simply by constructing the n-tuple $(x_1, x_2, \ldots, X_n) = P$.

Essentially, as shown in FIG. 1, once a set of parameters is selected, a graphical distribution of identifications is achievable in n-dimensions. The biometric information samples are provided to a processor. Registration is conducted against known templates in dependence upon the selected parameters. Once registration is complete, a single point is determined having coordinates equal to each of at least some of the registration results. Alternatively, the point has coordinates determined in dependence upon the registration results but not equal thereto. Plotting the point results in a point plotted in n-dimensional space. The processor then determines a probability distribution for the selected parameters. Alternatively, this is performed prior to the registration process for biometric information samples. Further, alternatively the probability distributions are determined or approximated in advance and stored in non-volatile memory.

Given an n-dimensional plot defined by a boundary function and a single point, a comparison determines whether or not the point falls below or above the function and optionally within or outside other known ranges. Stated differently, the point is analyzed to determine whether it falls within a suitable region wherein region is defined as an n-dimensional region having at least some known boundaries. When the point falls within a predetermined or suitable region, the individual is identified. When the point falls outside the predetermined or suitable region, the individual is not identified. The identification system then responds accordingly. Responses in the form of locking an individual out, denying an individual access, logging an attempted entry by an unidentified individual, etc. are well known and are beyond the scope of the present invention.

Referring to FIG. 3, a simplified flow diagram of another method according to the invention is shown. Biometric information samples are provided to a processor and associated with their biometric information sources in the form of finger tips, eyes, palm, or voice. The biometric information samples and the associated information are provided to a processor. The processor characterises the biometric information samples and registers them against templates. When the individual's alleged identification is known, registration is performed against templates associated with the individual and associated with same biometric information sources. Identification of an individual is conducted in a fashion similar to that set out for FIG. 1b above.

Figure 5:
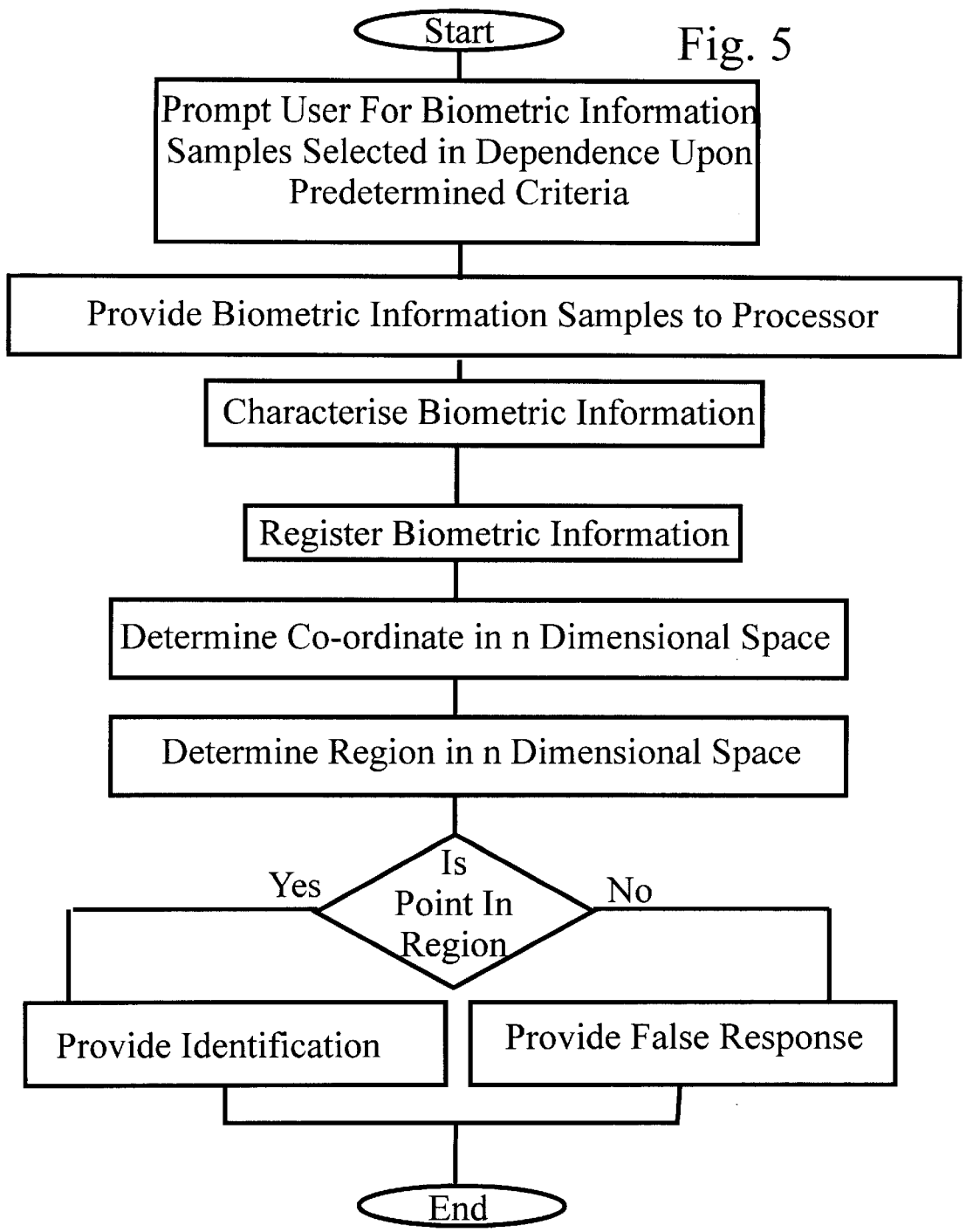
FIG. 5 is a flow diagram of another method of providing biometric information and identifying a user in dependence thereon according to the invention.

Referring to FIG. 4, a simplified flow diagram of another method according to the invention is shown. A processor prompts an individual for biometric information samples associated with biometric information sources selected by the processor at random. The biometric information samples are provided to the processor. The processor characterises the biometric information samples and registers them against templates. When the individual's alleged identification is known, registration is performed against templates associated with the same biometric information sources of the individual. Identification of an individual is conducted in a fashion similar to that set out for FIG. 1b above. Referring to FIG. 5, a simplified flow diagram of another method according to the invention is shown. A processor prompts an individual for biometric information samples associated with biometric information sources selected by the processor according to a predetermined algorithm. Optionally, the predetermined algorithm selects the biometric information sources in dependence upon the alleged identity of the user. The biometric information samples are provided to the processor. The processor characterises the biometric information samples and registers them against templates. When the individual's alleged identification is known, registration is performed against templates associated with the same biometric information sources of the individual. Identification of an individual is conducted in a fashion similar to that set out for FIG. 1b above.

Figure 6:
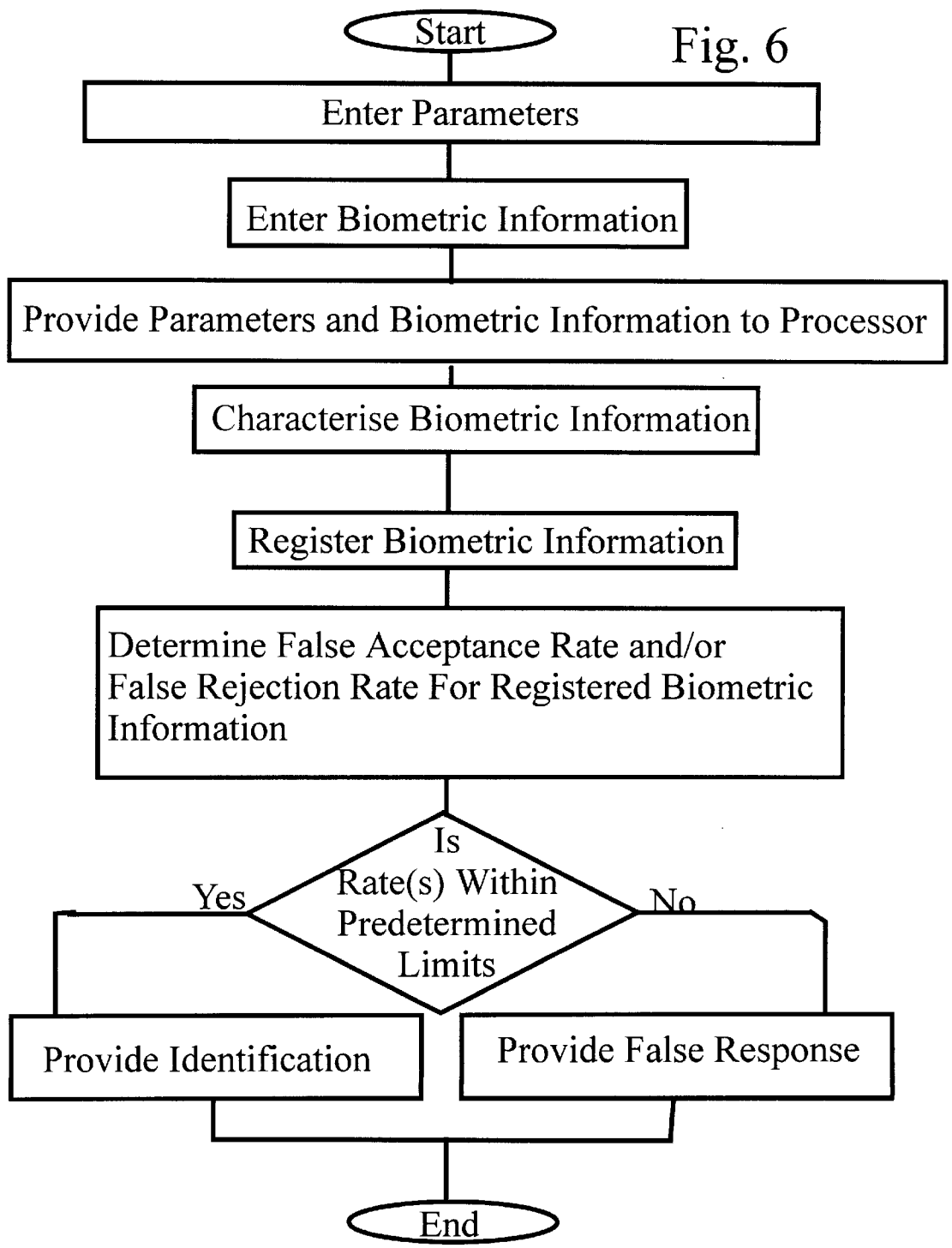
FIG. 6 is a flow diagram of another method of providing biometric information and identifying a user in dependence thereon according to the invention.

Referring to FIG. 6, a simplified flow diagram of another method according to the invention is shown. Biometric information samples and associated parameters are provided to a processor. The processor characterises the biometric information samples and registers them against templates. When the individual's alleged identification is known, registration is performed against templates associated with the individual and associated with same biometric information sources. Identification of an individual is performed by evaluating resulting values from the registration to determine a probability, for those results, of false acceptance and false rejection. When the value is within predetermined limits for an acceptable value, identification is provided. When the value falls outside the predetermined limits identification is not provided.

Figure 7:
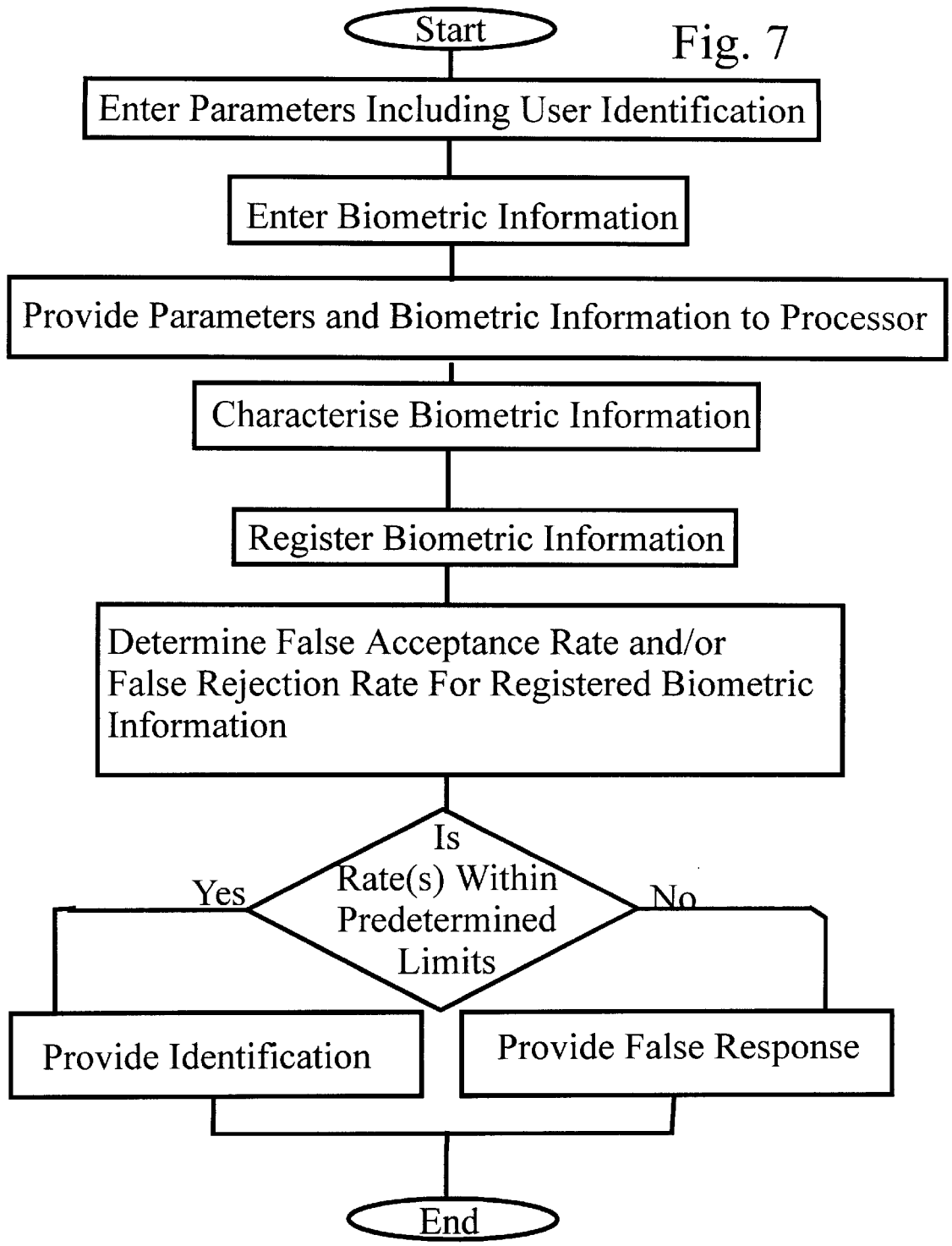
FIG. 7 is a flow diagram of another method of providing biometric information and identifying a user in dependence thereon according to the invention.

Referring to FIG. 7, a simplified flow diagram of another method according to the invention is shown. Biometric information samples and associated parameters including an alleged identification of the individual are provided to a processor. The processor characterises the biometric information samples and registers them against templates. When the individual's alleged identification is known, registration is performed against templates associated with the individual and associated with same biometric information sources. Identification of an individual is performed by evaluating resulting values from the registration to determine a probability, for those results, of false acceptance and false rejection. When the value is within predetermined limits for an acceptable value, identification is provided. When the value falls outside the predetermined limits identification is not provided.

Figure 8:
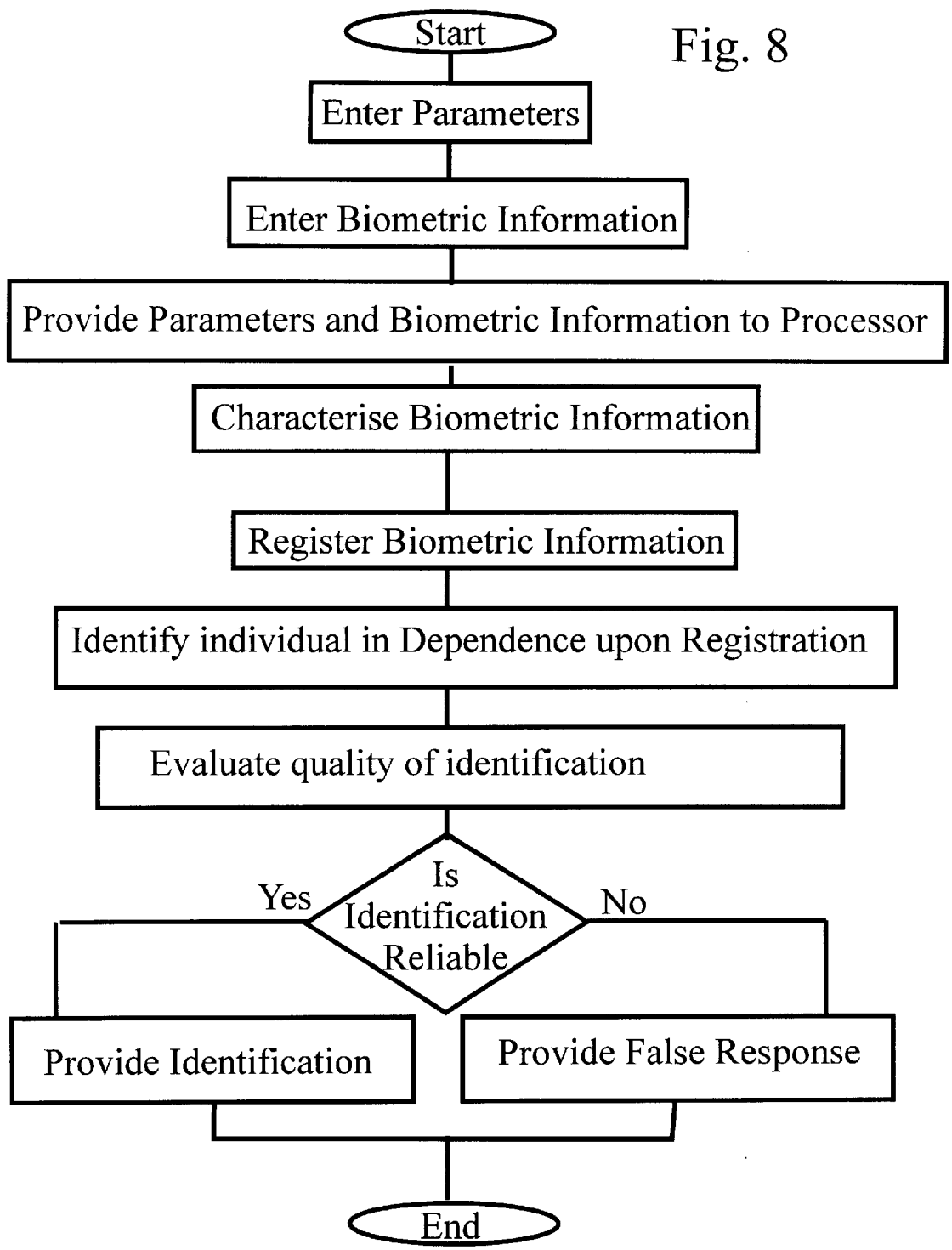
FIG. 8 is a flow diagram of another method of providing biometric information and identifying an individual in dependence thereon according to the invention.

Referring to FIG. 8, a simplified flow diagram of another method according to the invention is shown. Biometric information samples and associated parameters are provided to a processor. The processor characterises the biometric information samples and registers them against templates. When the individual's alleged identification is known, registration is performed against templates associated with the individual and associated with same biometric information sources. Identification of an individual is performed by evaluating resulting values from the registration to determine a quality of user identification. When the quality is within predetermined limits for an acceptable quality, identification is provided. When the value falls outside the predetermined limits identification is not provided.

Figure 9:
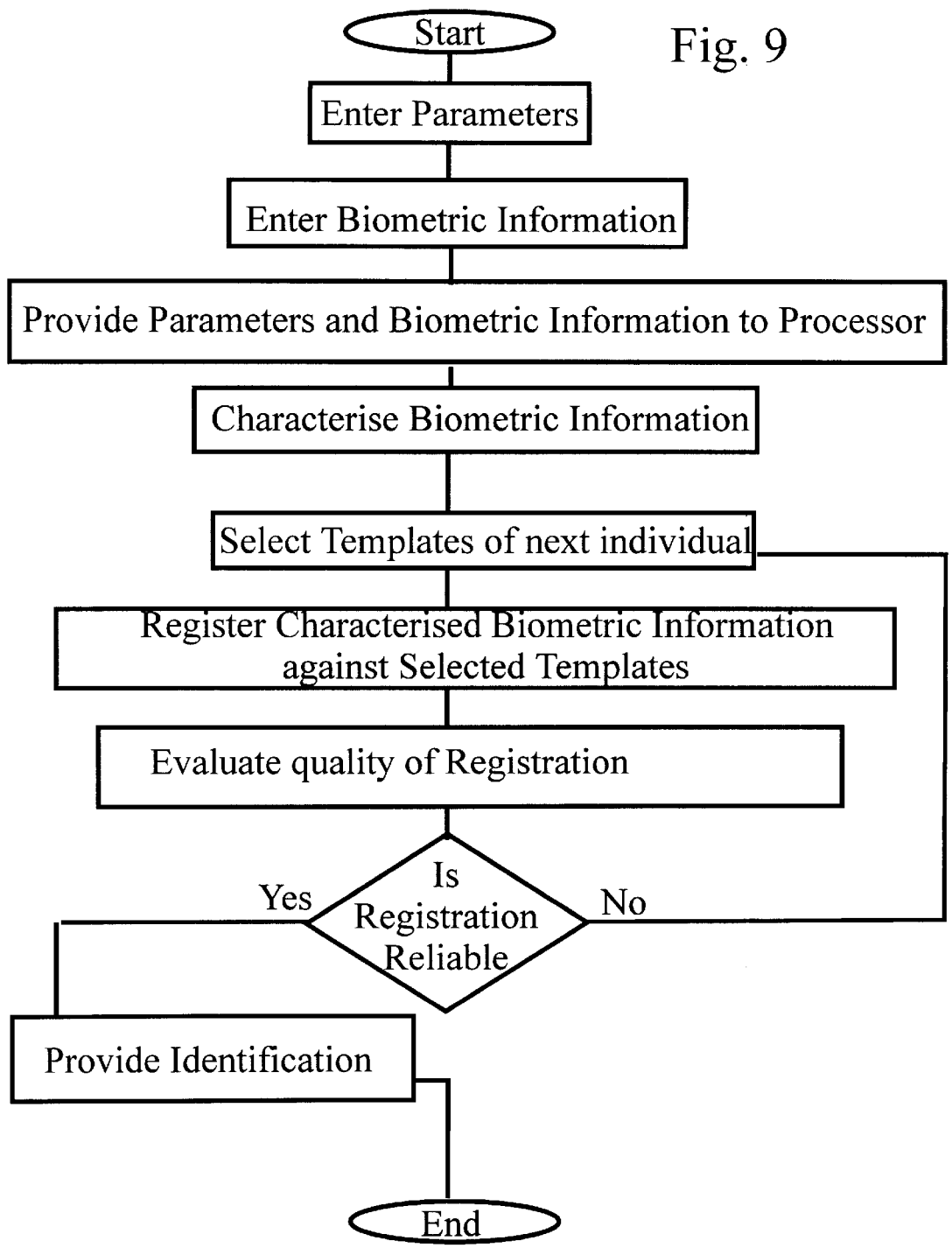
FIG. 9 is a flow diagram of another method of providing biometric information and identifying an individual in dependence thereon according to the invention.

Referring to FIG. 9, a simplified flow diagram of another method according to the invention is shown. Biometric information samples from an individual and associated parameters are provided to a processor. The processor characterises the biometric information samples and registers them against templates. A first set of templates associated with an individual and associated with same biometric information sources is selected. Registration of the biometric information samples is performed against the selected templates producing registration values. In dependence upon these values a quality of user identification is determined. When the quality is within predetermined limits for an acceptable quality, identification is provided. When the value falls outside the predetermined limits identification is not provided and a next set of templates is selected. Optionally, once all sets of templates are exhausted, an indication of failure to identify is provided.

Figure 10:
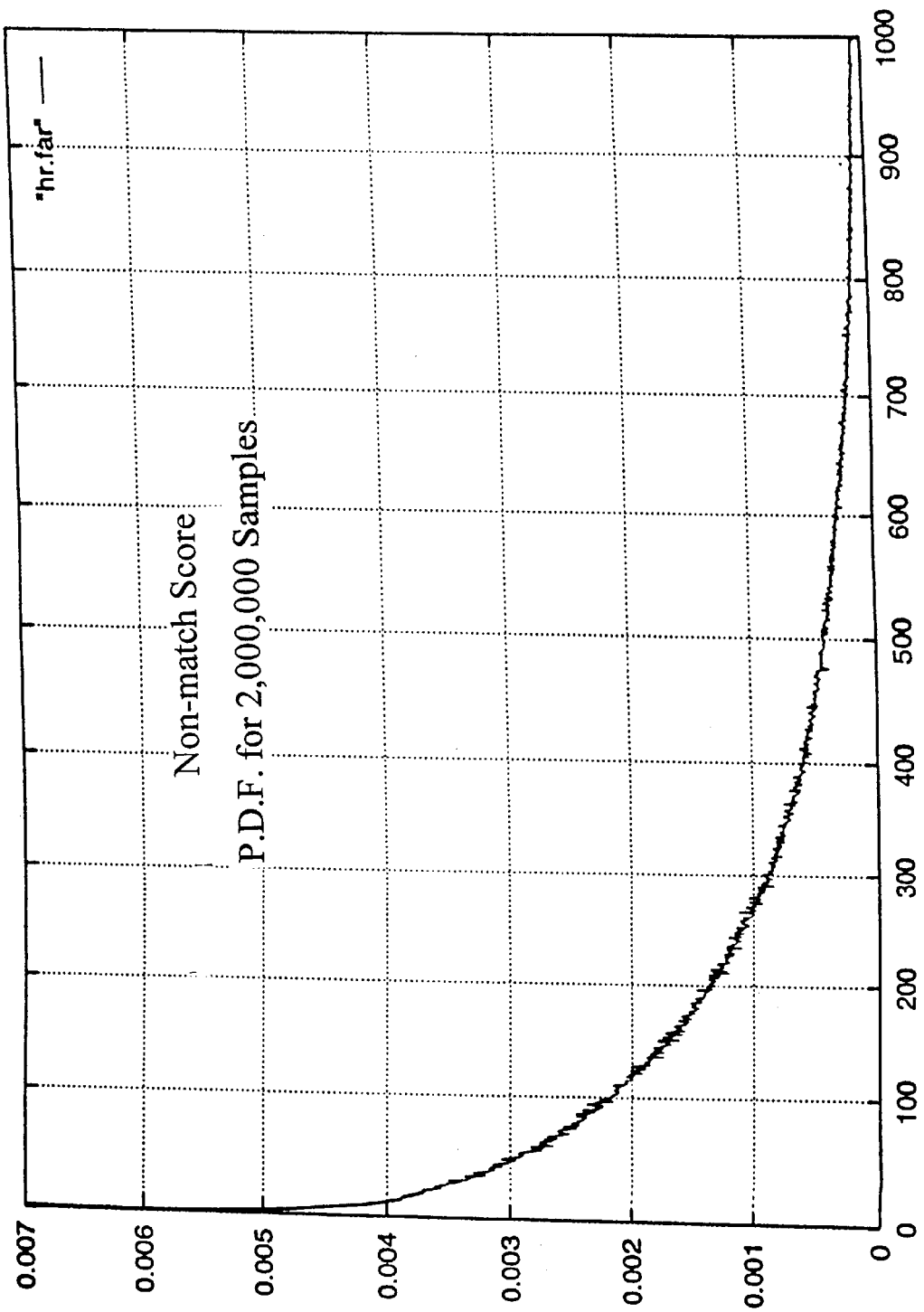
FIG. 10 is a probability distribution curve for individual identification using a biometric information sample; and, FIG. 11 is a two-dimensional probability distribution surface for individual identification in dependence upon a plurality of biometric information samples.

Referring to FIG. 10, a two dimensional probability distribution is shown. The total area below the distribution curve is 1 unit area. Using such a curve, false acceptance or false registration is described. Most biometric information samples are easily characterized. The high initial point on the probability curve and the steep decent to an asymptotic curve approaching 0 shows this. The line t marks the cutoff for registration effectiveness. This is determined in dependence upon an algorithm chosen and upon system limitations such as processor speed, memory, and security requirements. The shaded region bounded by Y=0, X>t, and the probability curve represents false acceptances.

Figure 11:
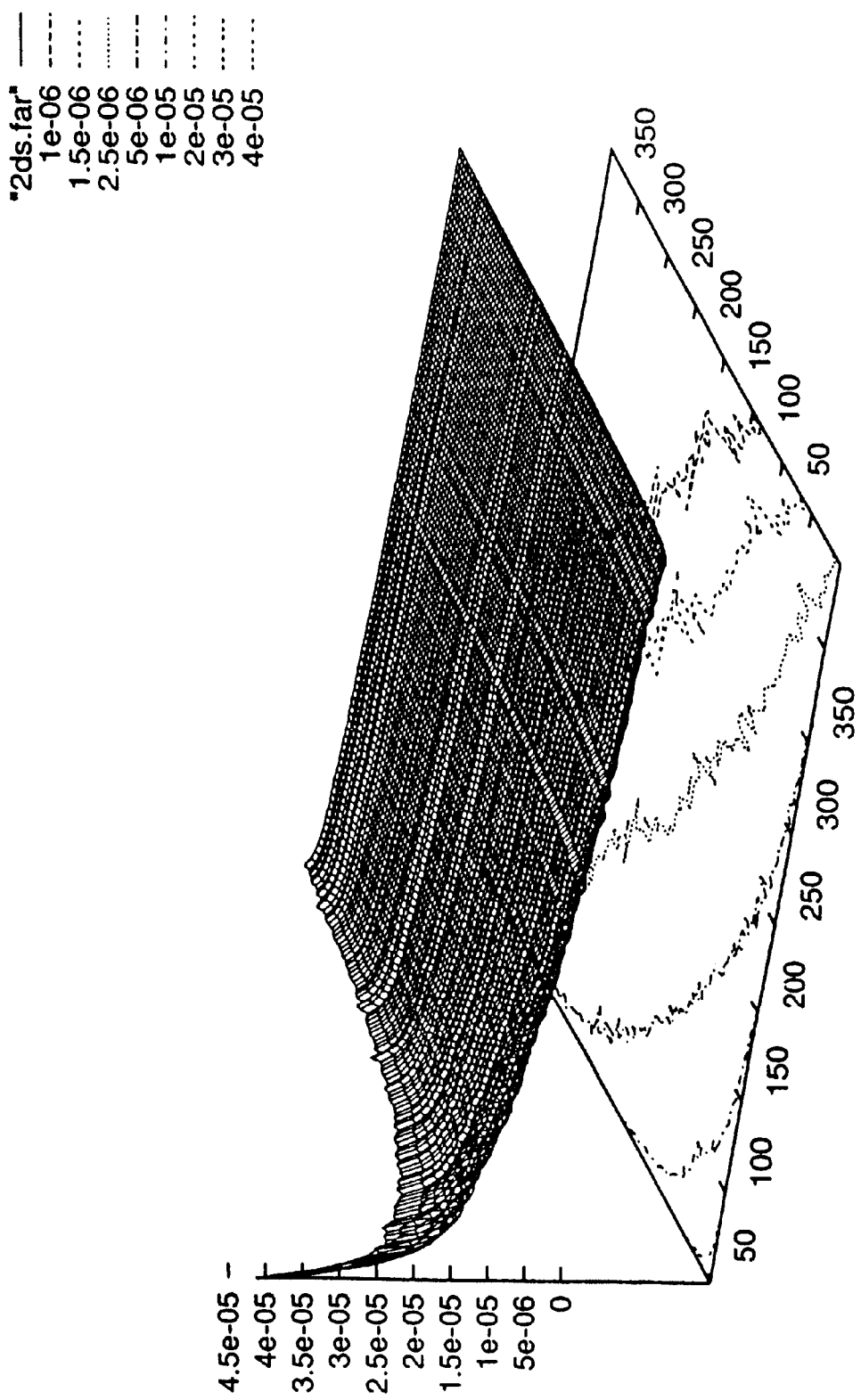

Referring to FIG. 11, a truncated two-dimensional probability distribution curve is shown. Now, false acceptance is represented by a region of three-dimensional space having a volume of 1 unit$^2$. Upon viewing the graph of actual data for fingerprint biometric information, it is apparent that the graph is symmetrical and that the graph extends toward infinity without reaching the plane z=O. Further, the diagonal center of the surface x=y is a minimum for a given x and y.

A plot showing an acceptance curve for registration is contained below the curve of FIG. 11. Here two parameters either from separate registrations or from a same biometric information sample registration are evaluated to determine a point. When the point falls below the line, the biometric information is not identified and correspondingly the individual is not identified. Alternatively, when the point falls within the shaded region, registration occurs. Extending this to a plurality of biometric information samples results in regions allowing for excellent registration of some samples, as shown in FIG. 11 at B, with moderate registrations of other samples. Using a plurality of biometric information samples, allows equivalent registration algorithms to provide greatly enhanced security or alternatively, allows faster and simpler registration algorithms to provide equivalent security.

In evaluating security of biometric authorization systems, false acceptance and false rejections are evaluated as a fraction of a user population. A security system is characterized as allowing 1 in 1,000 false acceptances or, alternatively, 1 in 1,000,000. Extending the graph of FIG. 11 to n dimensions, results in a different distribution for a region representing acceptance and, therefore, a match scores of a single biometric information sample that falls outside the shaded region of FIG. 11, when combined with several other similarly weak biometric information samples, is more likely to fall within an acceptable region. A reasonable correlation among several identifiers is a good indication of identity. Alternatively, using only a single biometric information sample, a low match score results in failure to authorize an individual. Likewise, a different individual entering a plurality of biometric information samples and trying to gain unauthorized access by, for example, posing as an authorized individual, is unlikely to match evenly across all samples and, whereas a single biometric information sample may match well, several will not. Further examination of an acceptance graph shows that excellent match scores of some samples reduce the necessary match scores for other samples for authorization to occur.

The probability density function is discussed below. Assume a probability density function, f, of non-match scores exists. That is, $$f: R \to [0, 1]$$

and $$\int_R f = 1$$

If S={x|x=score ($T_a$, $T_b$), where $T_a$ and $T_b$ are characterizations of distinct fingerprints}, then f is 0 outside of S, and $$\int_S f = \int_R f = 1$$

It should be noted that x∈S⇒x≧0 since score is a measure. An n-dimensional probability density function, g for a sequence of non-match scores is constructed by:

$$q(P) = \prod_i^n f(x_i), \text{ for } P \in R^n$$

Since each $f(x_i) \geq 0$, then it follows that $g(P) \geq 0$ and that $$\int_R f = 1 \Rightarrow \int_{R^n} g = 1$$

For any subset $U \subset S^n$, the probability that a collection of n scores of non-matching fingerprints lies in U is given by:

$$\int_U g$$

Given an n-dimensional probability density function, g, a region, $U_\alpha \subset S^n$ is defined, bounded "below" by a function, $h_\alpha: R^n \rightarrow R$.

$$U_\alpha = \{P \in S^n | h_\alpha(P) \leq C_\alpha\}.$$

$C_\alpha$, a constant, is calculated such that:

$$\int_{U_\alpha} g = \alpha$$

Thus, given a collection of n fingerprint match scores in the form of a point P, we determine when $P \in U_\alpha$ by applying the threshold function $h_\alpha$. Moreover, the probability that such a collection of scores belongs to $U_\alpha$ is $\alpha$ which can be interpreted as a predetermined false acceptance rate. The criteria $$h_\alpha(P) \geq C_\alpha$$

is used to accept the candidate when true, and reject the candidate otherwise.

Test Case

A large sample consisting of several million non-match comparisons has been generated from a database of fingerprint images in order to create a relative frequency distribution, F(X) of non-matching fingerprint scores. X=score $(T_a, T_b)$, where $T_a, T_b \in \tau$ are templates of different fingerprints. Note that the frequency distribution is a function of a discrete variable. For the purposes of the test case, we assumed that a continuous probability density function, f(x), of non-matching fingerprint comparisons exists, and all derivations are performed for the continuous case. When a calculation was required in dependence upon actual data, f was approximated by F, and integration was replaced by summation.

When we are given a sequence of n non-matching fingerprint scores, $\{x_i\}$, $1 \leq i \leq n$, then an n-dimensional probability density function, g, is derived as follows: Let $$P = (x_1, x_2, \ldots, x_n)$$

be a particular ordering of the sequence.

Define $g(P) = \prod_i^n f(x_i)$;

since $\int_R f = \int_S f = \int_0^\infty f(x) dx = 1$ and $R^n = R^{n-1} \times R$ then it follows that $$\int_{R^n} g = \int_{R^n} \prod_i^n f(x_i) d\bar{x} = \int_{R^{n-1}} \left( \int_R \left( \prod_i^{n-1} f(x_i) \right) f(x_n) dx_n \right) dx^{n-1}$$

$$= \int_{R^{n-1}} \left( \prod_i^{n-1} f(x_i) \int_R f(x_n) dx_n \right) dx^{n-1} = \int_{R^{n-1}} \left( \prod_i^{n-1} f(x_i) \cdot 1 dx^{n-1} \right)$$

$$= \int_{R^{n-1}} \left( \prod_i^{n-1} f(x_i) dx^{n-1} \right)$$

Repeatedly applying iterated integrals in such a manner, eventually results in $$\int_{R^n} g = 1$$

When $U \subset R_n$, the probability that a collection of n scores of non-matching fingerprints lies in U is calculated by iterated integrals over rectangles in $R^n$ by:

$$\int_{R^n} g = \int_{R^n} g \cdot \chi u$$

where $U \subset R$, and R is a rectangle in $R^n$, and $\chi u$ is the characteristic function of the set U $$\chi u(P) = \begin{cases} 1 & P \in U \\ 0 & P \notin U \end{cases}$$

assuming that $\chi u$ and f are integrable. In the discrete case, we analogously define $$G(P) = \prod_i^n F(x_i)$$

G(P) gives the probability that the n independent scores, $\{\chi_i\}$ of non-matching finger prints occur in a particular sequence. (Note that g(P) does not give a probability at any specific point since the measure, and hence the integral, over a single point is zero).

For purposes of calculating false acceptance rates in n-dimensions, we must attempt to construct regions in $R^n$ that have desirable properties. Suppose that $\alpha$ and $\beta$ are false acceptance rates. We would like to define regions $U_\alpha$, $U_\beta \subset R^n$ such that:

$$\int_{U_\alpha} g = \alpha \text{ and } \int_{U_\beta} g = \beta \quad (1)$$

$$U_\alpha = \{P \in S^n | h_\alpha(P) \geq C_\alpha\}, U_\beta = \{P \in S^n | h_\beta(P) \geq C_\beta\} \quad (2)$$

$$\alpha \leq \beta \Rightarrow U_\alpha \subseteq U_\beta \quad (3)$$

$$h_\alpha(P) = C_\alpha \Rightarrow g(P) \approx K_\alpha, h_\beta(P) = C_\beta \Rightarrow g(P) \approx K_\beta \quad (4)$$

The first condition simply defines a false acceptance rate as a probability. The second condition indicates that regions are bounded below by a threshold function where $C_\alpha$, $C_\beta$ are non-negative constants. The third condition states that when a point is a member of a false acceptance region with a lower probability, it also belongs to a false acceptance region associated with a higher probability. One way to achieve this is to have $h_\alpha = h_\beta$, (i.e. use the same function) and let $C_{\beta \leq C\alpha}$. The last condition attempts to ensure that points along or proximate the region boundaries retain substantially level contours on the n-dimensional probability density function. This reduces uneven boundaries "favouring" certain combinations of match scores.

It is worth noting that corresponding n-dimensional false rejection rates are calculated assuming that an analogous n-dimensional probability density function, g is constructed from the probability density function of fingerprint match scores. The corresponding false rejection rate for an n-dimensional false rejection rate$_\alpha$ is given by:

$$\int_{S^n - U_\alpha} g^*$$

Alternatively, the method is employed with retinal scanned biometric information. Further Alternatively, the method is employed with palm prints. Further Alternatively, the method is employed with non-image biometric data such as voiceprints.

One consequence of two different biometric sources is that the above math is complicated significantly. As a false acceptance rate for fingerprints may differ significantly from that of voice recognition devices or retinal scans, a different f(x) arises for the two latter cases resulting in asymmetric regions. For only fingerprint biometric information, ordering of samples is unimportant as false acceptance rates are substantially the same and therefor, the regions defined for registration are symmetrical as shown in FIG. 11. When different biometric source types are used and different functions for false acceptance result, order is important in determining point coordinates and an axis relating to voice recognition false acceptance should be associated with a coordinate value for same.

Numerous other embodiments may be envisaged without departing from the spirit and scope of the invention.

What is claimed is:

1. A method of registering biometric information of an individual comprising the steps of:
    a) providing a biometric information sample from each of a plurality of different biometric sources of the same individual to at least one biometric input device in communication with a host processor;
    b) associating each provided biometric information sample with a biometric source;
    c) using the processor, registering each biometric information sample against a template associated with the associated biometric source;
    d) determining a plurality of registration values in dependence upon the results of step (c), each registration value from the plurality of registration values relating to a different provided biometric information sample; and,
    e) when some of the determined registration values relate to security levels below a predetermined threshold value and a combination of the plurality of registration values relates to a security level above a same predetermined threshold, performing one of authorising and identifying the individual in dependence upon the plurality of determined registration values, wherein a single biometric information sample with a determined registration value below the predetermined threshold value when taken in isolation, if the individual were authorised or identified, would result in a security level below a predetermined minimum allowable security level.

2. A method of registering biometric information of an individual as defined in claim 1 further comprising the steps of:
    the host processor determining biometric information sources for provision to the
    biometric input means; and,
    prompting the individual to provide each biometric information sample.

3. A method of registering biometric information of an individual as defined in claim 2 wherein the biometric information sources are determined at random.

4. A method of registering biometric information of an individual as defined in claim 1 wherein the biometric information sources comprise at least two different fingertips.

5. A system for registering biometric information of an individual comprising:
    a) means for providing a biometric information sample from each of a plurality of biometric sources of the same individual to at least one biometric input device in communication with a host processor;
    b) means for associating each biometric information sample provided with a biometric source of the individual;
    c) means for using the processor, registering each biometric information sample against a template associated with the associated biometric source and a same individual;
    d) means for determining registration values in dependence upon the results of step (c); and,
    e) means for when some of the determined registration values relate to security levels below a predetermined threshold value and a combination of the plurality of registration values relates to a security level above a same predetermined threshold, performing one of authorising and identifying the individual in dependence upon the plurality of determined registration values, wherein a single biometric information sample with a determined registration value below the predetermined threshold value when taken in isolation, if the individual were authorised or identified, would result in a security level below a predetermined minimum allowable security level.

6. A method of registering biometric information of an individual as defined in claim 1 wherein the host processor associates the biometric information sources and the biometric information samples.

7. A method of registering biometric information of an individual as defined in claim 1 wherein threshold is a probability of false acceptance.

8. A method of registering biometric information of an individual as defined in claim 1 wherein the individual associates the biometric information sources and the biometric information samples.

9. A method of registering biometric information of an individual as defined in claim 8 further comprising the step of:
    the individual determining biometric information sources for provision to the biometric input means.

10. A method of registering biometric information of an individual as defined in claim 1 wherein the biometric information sources of an individual forms further data for use in determining the security level of the combination of the plurality of registration values.

11. A method of registering biometric information of an individual as defined in claim 1 further comprising the step of:

the individual determining biometric information sources for provision to the biometric input means.

12. A method of registering biometric information of an individual as defined in claim 1 wherein all registration values are below the predetermined threshold and the combined registration values are above a same predetermined threshold.

13. A method of registering biometric information of an individual as defined in claim 1 further comprising the step of:

using the processor, analysing the determined biometric information sources to determine a likelihood of false acceptance; and, when the likelihood of false acceptance is above a predetermined level, prompting for further biometric information from other biometric information sources.

14. A method of registering biometric information of an individual in dependence upon stored templates of biometric information comprising the steps of:

a) providing a set of parameters comprising a set of biometric information sources to a host processor;

b) in dependence upon the set of biometric information sources, providing biometric information samples from a same individual from at least some of the sources to at least a biometric input device in communication with the host processor;

c) using the host processor, registering the biometric information samples against some of the templates associated with a same individual to produce a set of registration values;

d) when some of the determined registration values relate to security levels below a predetermined threshold value and a combination of the plurality of registration values relates to a security level above a same predetermined threshold, determining if a point in a multidimensional space and having coordinates corresponding substantially to the registration values falls within a multidimensional range determined in dependence upon a predetermined false acceptance rate; and, e) identifying the individual when the point falls within the multidimensional range corresponding to the acceptable false acceptance rate.

15. A method of registering biometric information of an individual in dependence upon stored templates of biometric information as defined in claim 14 wherein the set of parameters comprises a user identification corresponding to the individual.

16. A method of registering biometric information of an individual in dependence upon stored templates of biometric information as defined in claim 14 wherein the set of parameters comprises a parameter associated with the acceptable false acceptance rate.

* * * * *

UNITED STATES PATENT AND TRADEMARK OFFICE
CERTIFICATE OF CORRECTION

PATENT NO. : 6,038,334
DATED : March 14, 2000
INVENTOR(S) : Hamid

It is certified that error appears in the above-identified patent and that said Letters Patent is hereby corrected as shown below:

COLUMN 7,
Line 37, the equation "$H_k=\{I_i|I_iI_k\}$" should read --$H_k=\{I_i|I_i\equiv I_k\}$--
Line 51, the expression "$I_R \subset I$" should read --$I_R \subseteq I$--
Line 57, the expression "$(x_1, x_2, ..., X_n)=P$" should read --$(x_1, x_2, ..., x_n)=P$--

COLUMN 11,
Line 1, the expression "for $P \in R''''$" should read --for $P \in R^n$--
Line 12, the expression "$U \subset S^m$" should read --$U \subseteq S^n$--
Line 19, the expression "$U_\alpha \subset S^m$" should read --$U_\alpha \subseteq S^n$--
Line 22, the expression "$U_\alpha = \{P \in S^n | h_\alpha(P) \leq C_\alpha\}$" should read
--$U_\alpha = \{P \in S^n | h_\alpha(P) \geq C_\alpha\}$--
Line 45, the expression "$T_a, T_b \in \tau are$" should read --$T_a, T_b \in \tau$ are--

COLUMN 12,
Line 23, the expression "$U \subset R_n$" should read --$U \subseteq R^n$--
Line 31, the expression "$U \subset R$" should read --$U \subseteq R$--
Line 43, the expression "$\{\chi i\}$" should read --$\{x_i\}$--
Line 53, the expression "$U_{\beta \subset R^m}$" should read --$U_\beta \subseteq R^n$--

COLUMN 13,
Line 4, the expression "$C_{\beta \leq C \alpha}$" should read --$C_\beta \leq C_\alpha$--
Line 12, the expression "g" should be replaced with --g*--

Signed and Sealed this

Twelfth Day of June, 2001

*Attest:*

*Nicholas P. Godici*

*Attesting Officer*

NICHOLAS P. GODICI
*Acting Director of the United States Patent and Trademark Office*